US012743386B2

(12) United States Patent
Lee et al.

(10) Patent No.: US 12,743,386 B2
(45) Date of Patent: Sep. 22, 2026

(54) MEMORY DEVICE INCLUDING COMMAND-ADDRESS MANAGEMENT CIRCUIT, METHOD OF OPERATING THE SAME, AND MEMORY SYSTEM

(71) Applicant: Samsung Electronics Co., Ltd., Suwon-si (KR)

(72) Inventors: Doogie Lee, Suwon-si (KR); Sookyung Ko, Suwon-si (KR); Moonsang Kwon, Suwon-si (KR); Inhwan Doh, Suwon-si (KR); Hyejoon Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 18/829,635

(22) Filed: Sep. 10, 2024

(65) Prior Publication Data

US 2025/0225086 A1 Jul. 10, 2025

(30) Foreign Application Priority Data

Jan. 10, 2024 (KR) ........................ 10-2024-0004350

(51) Int. Cl.
*G06F 13/16* (2006.01)

(52) U.S. Cl.
CPC ...... *G06F 13/1621* (2013.01); *G06F 13/1642* (2013.01)

(58) Field of Classification Search
CPC ......................... G06F 13/1621; G06F 13/1642
See application file for complete search history.

(56) References Cited

U.S. PATENT DOCUMENTS

| | | | | |
|---|---|---|---|---|
| 6,963,949 | B2 | 11/2005 | Ryan | |
| 9,792,995 | B1 * | 10/2017 | Shah | G11C 7/1039 |
| 10,877,696 | B2 | 12/2020 | Wakchaure et al. | |
| 11,048,571 | B2 | 6/2021 | Ioannou et al. | |
| 11,216,189 | B2 | 1/2022 | Li et al. | |
| 11,507,322 | B2 * | 11/2022 | Na | G06F 3/0659 |
| 2018/0232325 | A1 | 8/2018 | Choi et al. | |
| 2019/0205225 | A1 * | 7/2019 | Kim | G06F 13/4239 |
| 2019/0227736 | A1 * | 7/2019 | Hong | G06F 3/0659 |
| 2019/0369917 | A1 * | 12/2019 | Jin | G06F 13/1626 |
| 2020/0192735 | A1 * | 6/2020 | Ioannou | G06F 3/064 |
| 2020/0310643 | A1 * | 10/2020 | Li | G06F 3/061 |
| 2022/0197560 | A1 * | 6/2022 | Na | G06F 3/0652 |
| 2022/0236915 | A1 * | 7/2022 | Kang | G06F 12/0246 |

* cited by examiner

*Primary Examiner* — Henry Tsai
*Assistant Examiner* — Christopher A Daley
(74) *Attorney, Agent, or Firm* — Fish & Richardson P.C.

(57) ABSTRACT

Provided is a memory device including a control logic circuit connected to a first bus and configured to receive a first command-address and a second command-address from an external device, an input/output (I/O) circuit connected to a second bus and configured to transmit and receive data to and from the external device, and a command-address management circuit configured to store the second command-address from the control logic circuit.

20 Claims, 13 Drawing Sheets

200b
230
PL1
MEMORY PLANE 1
VAL1
PL2
MEMORY PLANE 2
VAL2
PL3
MEMORY PLANE 3
VAL3
PL4
MEMORY PLANE 4
VAL4
240b
CONTROL LOGIC CIRCUIT
CA1
CA QUEUE
CA2
272
MONITORING CIRCUIT
271
260
I/O CIRCUIT
VAL1
CA1
CA2
DQ1
: CA1 PATH
: CA2 PATH

FIG. 8

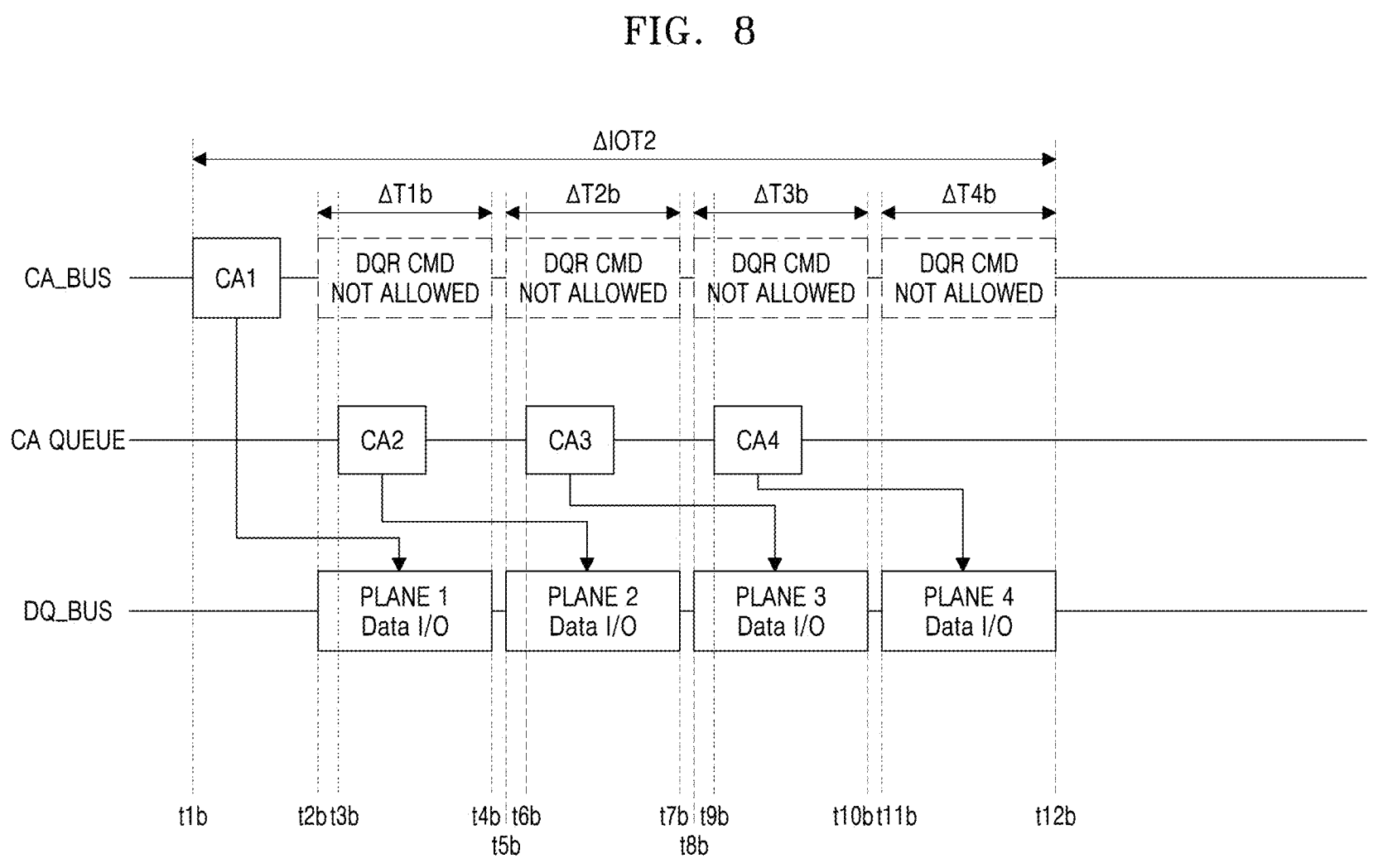

ΔIOT2

ΔT1b ΔT2b ΔT3b ΔT4b

DQR CMD NOT ALLOWED

DQR CMD NOT ALLOWED

DQR CMD NOT ALLOWED

DQR CMD NOT ALLOWED

CA_BUS

CA1

CA QUEUE

CA2 CA3 CA4

DQ_BUS

PLANE 1 Data I/O

PLANE 2 Data I/O

PLANE 3 Data I/O

PLANE 4 Data I/O t1b t2b t3b t4b t5b t6b t7b t8b t9b t10b t11b t12b

MEMORY DEVICE INCLUDING COMMAND-ADDRESS MANAGEMENT CIRCUIT, METHOD OF OPERATING THE SAME, AND MEMORY SYSTEM

CROSS-REFERENCE TO RELATED APPLICATION

This application is based on and claims priority under 35 U.S.C. § 119 to Korean Patent Application No. 10-2024-0004350, filed on Jan. 10, 2024, in the Korean Intellectual Property Office, the disclosure of which is incorporated by reference herein in its entirety.

BACKGROUND

The inventive concepts relate to memory devices, methods of operating the same, and memory systems, and more particularly, to memory devices and memory systems supporting a Separate Command Address (SCA) protocol.

Recently, the large capacity and high integration of memory systems are required according to the multi-functionality of information communication devices. Accordingly, it may be advantageous to improve input/output (I/O) performance of the memory systems. The recently developed memory system may be configured to transmit commands and addresses through a command address (CA) bus and transmit data through a DQ bus, according to the SCA protocol. Accordingly, it is possible to improve the I/O efficiency of the memory system by configuring the bus separately. The memory system may include a plurality of memory chips, in which the I/O efficiency of the memory system may be improved by transmitting commands and addresses to one memory chip through the CA bus while transmitting data through another memory chip through the DQ bus.

However, when the memory chip performs an I/O operation in relation to any one memory plane in the memory chip, the memory chip may not receive a command and an address for another plane in the same memory chip. Therefore, there is a need for a method that can improve I/O efficiency in relation to operations (e.g., multi-plane operations) within a single memory chip.

SUMMARY

The inventive concepts provide a memory device, methods of operating the same, and memory systems, which may improve the efficiency of input/output (I/O) operations in relation to multi-plane operations performed in a memory chip.

The technical tasks of the inventive concepts are not limited to the technical tasks described above, and other technical tasks not mentioned may be clearly understood by a person skilled in the art from the following description.

According to an aspect of the inventive concepts, there is provided a memory device including a memory cell array including a first memory plane and a second memory plane, a control logic circuit connected to a first bus, the control logic circuit configured to receive a first command-address and a second command-address from an external device, an input/output (I/O) circuit connected to a second bus, the I/O circuit configured to transmit and receive data to and from the external device, and a command-address management circuit configured to receive the second command-address from the control logic circuit based on a state of the second bus, wherein the command-address management circuit includes a command-address queue configured to store the second command-address, and a monitoring circuit configured to monitor the state of the second bus.

According to an aspect of the inventive concepts, there is provided a method of operating a memory device including a first memory plane and a second memory plane operating independently of each other, the method including receiving a first command-address instructing an input/output (I/O) operation for the first memory plane through a first bus, performing an operation corresponding to the first command-address, receiving a second command-address instructing an I/O operation for a second memory plane through the second bus, storing the second command-address in a command-address queue based on a state of a second bus, and performing an operation corresponding to the second command-address.

According to an aspect of the inventive concepts, there is provided a memory system including a memory controller configured to generate a first command-address and a second command-address, a memory device configured to perform an operation in response to the first command-address and the second command-address, a first bus configured to provide the first command-address and the second command-address to the memory device from the memory controller, and a second bus configured to transfer data between the memory controller and the memory device, wherein the memory device includes a memory cell array including a first memory plane and a second memory plane, a control logic circuit connected to the first bus and configured to receive the first command-address and the second command-address, an input/output (I/O) circuit connected to the second bus and configured to transmit and receive data to and from the memory controller, and a command-address management circuit configured to receive the second command-address through the control logic circuit based on a state of the second bus, wherein the command-address management circuit includes a command-address queue configured to store the second command-address, and a monitoring circuit configured to monitor the state of the second bus.

BRIEF DESCRIPTION OF THE DRAWINGS

Example embodiments of the inventive concepts will be more clearly understood from the following detailed description taken in conjunction with the accompanying drawings in which:

FIG. 8 is a diagram illustrating a method of operating a memory device according to some example embodiments;

DETAILED DESCRIPTION

Figure 1:
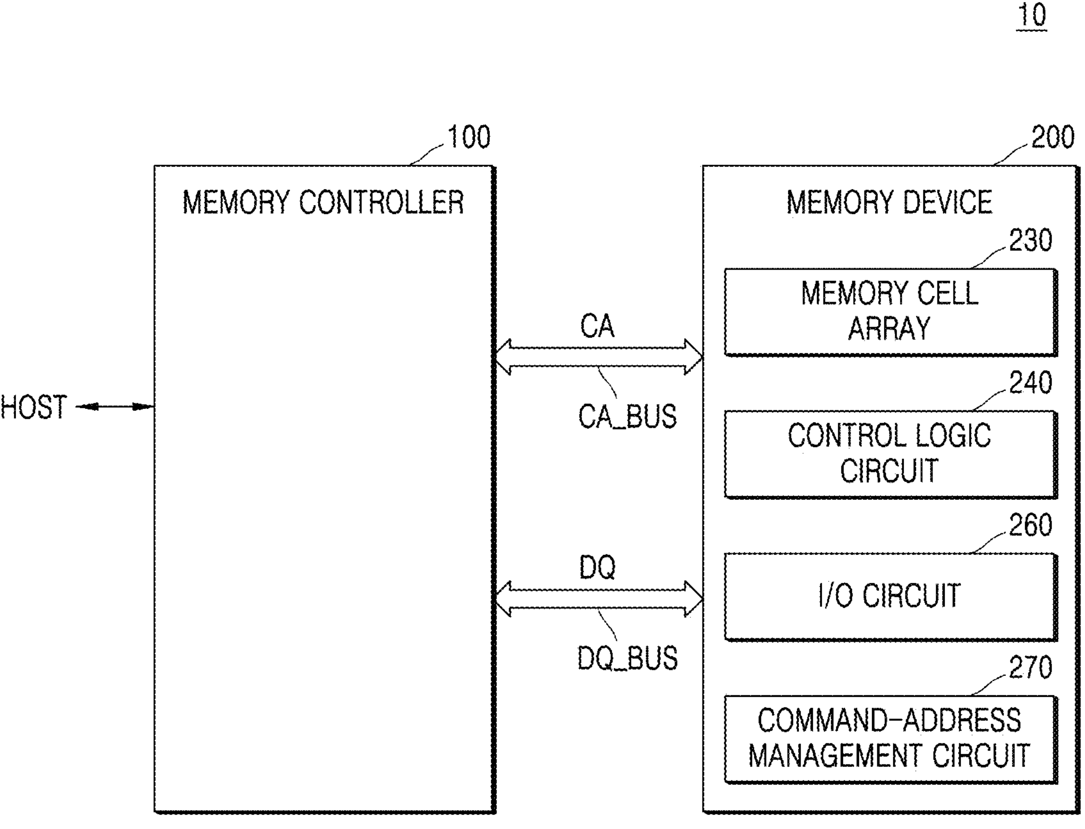
FIG. 1 is a block diagram of a memory system according to some example embodiments.

Hereinafter, some example embodiments will be described in detail with reference to the accompanying drawings. When described with reference to the drawings, the same or corresponding components are assigned with the same reference numerals, and redundant descriptions thereof are omitted.

FIG. 1 is a block diagram of a memory system 10 according to some example embodiments.

Referring to FIG. 1, the memory system 10 may include a memory controller 100, a memory device 200, a command-address bus CA_BUS, and a data bus DQ_BUS.

In some example embodiments, the memory system 10 may be implemented as an internal memory embedded in an electronic device and may be, for example, an embedded universal flash storage (UFS) memory device, an embedded multi-media card (eMMC), or a solid state drive (SSD). In some example embodiments, the memory system 10 may be implemented as an external memory detachable from an electronic device and may be, for example, a UFS memory card, a Compact Flash (CF) memory card, a Secure Digital (SD) memory card, a Micro-SD (Micro-SD) memory card, a Mini-SD (Mi-SD) memory card, an extreme digital (xD) memory card, or a memory stick.

The memory controller 100 may control the memory device 200 to read data stored in the memory device 200 or to write data to the memory device 200 in response to a read/write request from a host HOST. Specifically, the memory controller 100 may control write, read, and erase operations of the memory device 200 by providing the address-command signal CA and the data DQ to the memory device 200.

The memory device 200 may include a memory cell array 230, a control logic circuit 240, an I/O circuit 260, and a command-address management circuit 270. In some example embodiments, the memory device 200 may be referred to as a chip, a NAND chip, a semiconductor chip, or a memory chip.

The memory cell array 230 may include a plurality of memory cells, for example, the plurality of memory cells may be flash memory cells. The memory cell array 230 may include a plurality of cell strings (or NAND strings) respectively connected to points where a plurality of string selection lines and a plurality of bit lines cross each other, and each cell string may include a plurality of memory cells. For example, the cell strings may be implemented to extend vertically from a semiconductor substrate, and accordingly, each cell string may include a plurality of memory cells positioned vertically based on the semiconductor substrate. The memory cells included in the cell strings may be respectively connected to a plurality of word lines.

In some example embodiments, the memory cell array 230 may include at least one memory plane. One memory plane may include a plurality of memory blocks. One memory block may include a plurality of memory cells.

The control logic circuit 240 may control the operation of the memory device 200 based on the command-address signal CA provided through the command-address bus CA_BUS. In the present specification, the command-address CA may refer to a data related command-address. The data related command-address may mean a signal accompanied by an I/O operation of data through the data bus DQ_BUS in a process in which the memory device 200 performs an operation indicated by the command-address CA. Examples of the data related command-address may include a read command and a write command. In addition, in some example embodiments, an erase command may be included as an example of the data related command-address, and other commands related to the data bus DQ_BUS initiated by an SCA protocol may be included as another example of the data related command-address.

The command-address CA may include command-address information required for the memory controller 100 to instruct the memory device 200 to operate. The command-address information may include command information and address information.

In some example embodiments, when the data bus DQ_BUS is in a busy state, the control logic circuit 240 may provide the received command-address CA to the command-address management circuit 270.

In some example embodiments, when the data bus DQ_BUS is in an idle state, the control logic circuit 240 may control the memory device 200 to perform an operation corresponding to the received command-address CA.

The I/O circuit 260 may perform I/O operations related to data DQ. The I/O circuit 260 may provide the memory cell array 230 with data included in the data DQ provided through the data bus DQ_BUS. In addition, the I/O circuit 260 may provide data stored in the memory cell array 230 to the memory controller 100 through the data bus DQ_BUS.

In some example embodiments, the I/O circuit 260 may provide data DQ including data stored in the memory cell array 230 to the memory controller 100 through the data bus DQ_BUS.

In some example embodiments, the I/O circuit 260 may store data DQ provided from the memory controller 100 in the memory cell array 230.

The command-address management circuit 270 may store the command-address CA provided from the control logic circuit 240. The command-address management circuit 270 may monitor a state of the data bus DQ_BUS. For example, the data bus DQ_BUS may be in a busy state or an idle state. The memory device 200 may perform an operation related to the command-address CA received by the control logic circuit 240, based on the state of the data bus DQ_BUS monitored by the command-address management circuit 270, or may store the command-address CA received by the control logic circuit 240 in the command-address management circuit 270.

In some example embodiments, when the data DQ is transmitted from the memory controller 100 to the memory device 200 or from the memory device 200 to the memory controller 100 through the data bus DQ_BUS, the data bus DQ_BUS may be in a busy state. In this case, the I/O circuit 260 may be referred to as performing an I/O operation. In some configurations, in this case, the I/O circuit 260 may also be referred to as being in a busy state.

In some example embodiments, when the transmission of the data DQ between the memory controller 100 and the memory device 200 is completed, the data bus DQ_BUS may be in an idle state. In this case, the I/O circuit 260 may be referred to as not performing an I/O operation. In some configurations, in this case, the I/O circuit 260 may also be referred to as being in an idle state. The specific description of the command-address management circuit 270 is given below with reference to FIGS. 4A and 4B.

The command-address CA may be provided from the memory controller 100 to the memory device 200 through the command-address bus CA_BUS. The command-address CA may be a signal including commands and addresses required for the memory controller 100 to instruct the memory device 200 to operate. In some example embodiments, the command-address bus CA_BUS may be referred to as a first bus.

Data DQ may be provided from the memory controller 100 to the memory device 200 through the data bus DQ_BUS. Likewise, data DQ may be provided from the memory device 200 to the memory controller 100 through the data bus DQ_BUS. In some example embodiments, the data bus DQ_BUS may be referred to as a second bus.

Figure 2:
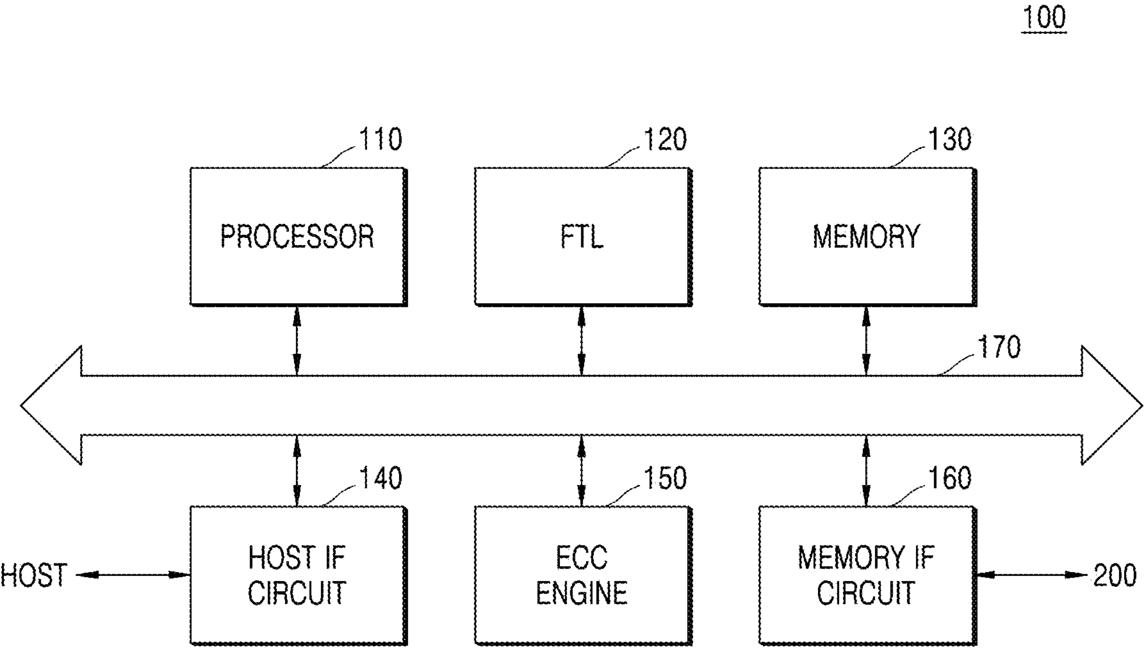
FIG. 2 is a block diagram illustrating a memory controller according to some example embodiments.

FIG. 2 is a block diagram illustrating a memory controller 100 according to some example embodiments. FIG. 2 may be described with reference to FIG. 1, and redundant descriptions may be omitted.

Referring to FIG. 2, the memory controller 100 may include a processor 110, a flash translation layer (FTL) 120, a memory 130, a host interface circuit 140, an error correction coding (ECC) engine 150, and a memory interface circuit 160, which may communicate with each other through a bus 170.

The processor 110 may include a central processing unit, a microprocessor, or the like and may control the overall operation of the memory controller 100. The processor 110 may include one or more processor cores capable of executing an instruction set of program code configured to perform a specific operation. For example, the processor 110 may execute command code of firmware stored in the memory 130.

The FTL 120 may perform several functions such as address mapping, wear-leveling, and garbage collection. An address mapping operation is an operation of changing a logical address received from a host into a physical address used to actually store data in the memory cell array 230. The wear-leveling is a technique for preventing or reducing in likelihood excessive deterioration of a specific block by uniformly using blocks in the memory cell array 230 and may be implemented through firmware technology that balances erase counts of physical blocks. The garbage collection is a technique for ensuring available capacity in the memory cell array 230 through a method of copying valid data of a block to a new block and then erasing the existing block.

The memory 130 may be used as an operation memory, a buffer memory, a cache memory, or the like, and the memory 130 may be, for example, implemented as dynamic random access memory (DRAM), static random access memory (SRAM), phase-change random access memory (PRAM), or flash memory.

The host interface circuit 140 may provide an interface between a host HOST and the memory controller 100 of FIG. 1, for example, a universal serial bus (USB), MMC, PCI Express (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), Integrated Drive Electronics (IDE), etc. may be provided. The host interface circuit 140 may receive a request and data from the host HOST and may output data to the host HOST.

The ECC engine 150 may perform an error detection and correction function on read data of the memory device 200. More specifically, the ECC engine 150 may generate parity bits for the write data to be provided to the memory device 200, and the generated parity bits may be stored in the memory device 200 together with the write data. When reading data from the memory device 200, the ECC engine 150 may correct an error in the read data using parity bits read from the memory device 200 together with the read data and may output the error-corrected read data.

The memory interface circuit 160 may provide an interface between the memory controller 100 and the memory device 200. For example, data, commands, and addresses may be transmitted and received between the memory controller 100 and the memory device 200 through the memory interface circuit 160.

The bus 170 may operate based on one of various bus protocols. The various bus protocols may include at least one of an Advanced Microcontroller Bus Architecture (AMBA) protocol, a USB protocol, an MMC protocol, a Peripheral Component Interconnect (PCI) protocol, a PCI-Express (PCI-E) protocol, an ATA protocol, a Serial-ATA protocol, a Parallel-ATA protocol, a SCSI protocol, an ESDI protocol, an IDE protocol, a Mobile Industry Processor Interface (MIPI) protocol, a UFS protocol, and the like.

Figure 3:
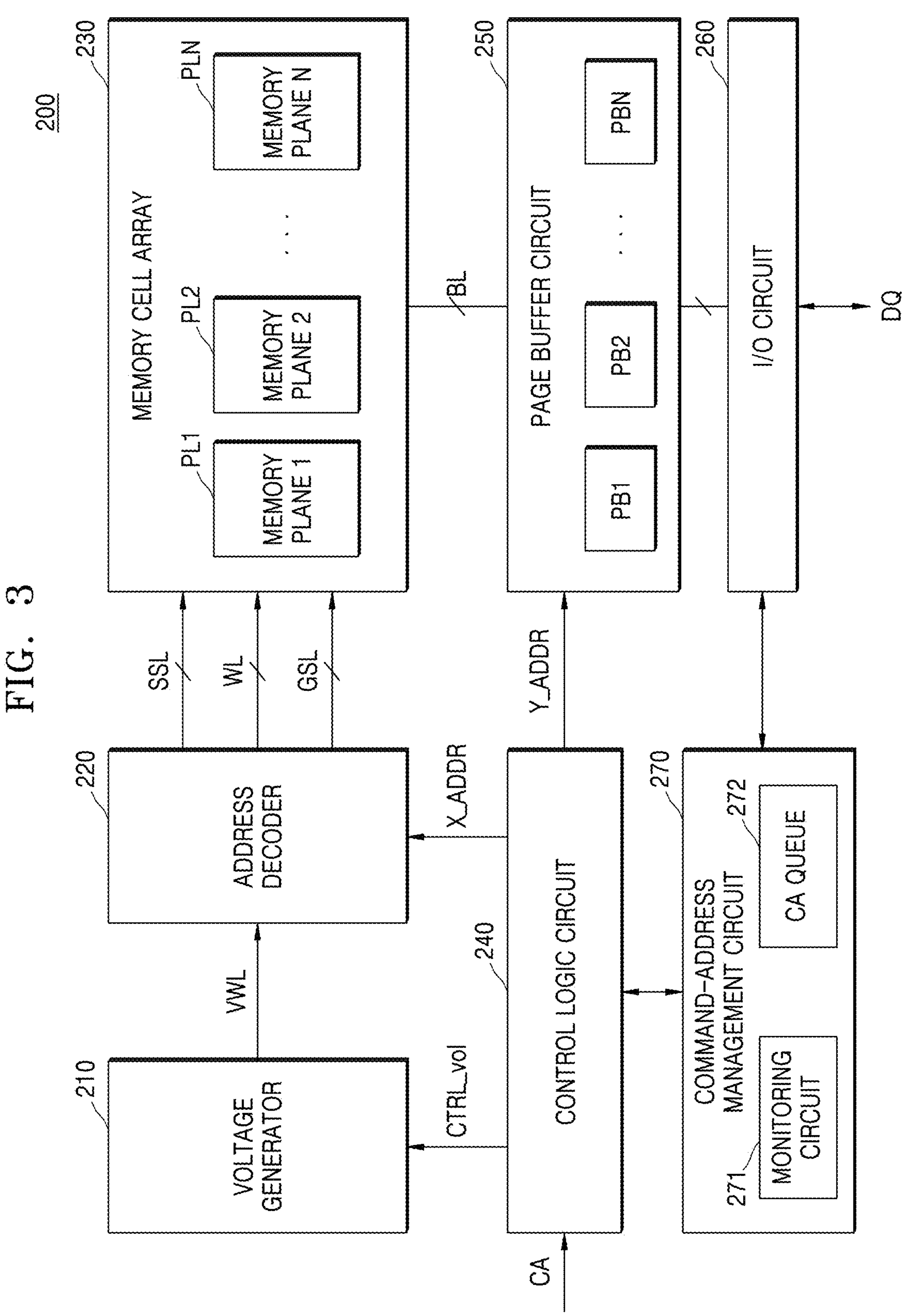
FIG. 3 is a block diagram illustrating a memory device according to some example embodiments.

FIG. 3 is a block diagram illustrating a memory device 200 according to some example embodiments. FIG. 3 may be described with reference to FIGS. 1 and 2, and redundant descriptions may be omitted.

Referring to FIG. 3, the memory device 200 may include a voltage generator 210, an address decoder 220, a memory cell array 230, a control logic circuit 240, a page buffer circuit 250, an I/O circuit 260, and a command-address management circuit 270.

The voltage generator 210 may generate various types of voltages for performing program, read, and erase operations on the memory cell array 230 based on a voltage control signal CTRL_vol. Specifically, the voltage generator 210 may generate a word line voltage VWL, for example, a program voltage, a read voltage, a pass voltage, an erase verification voltage, a program verification voltage, or the like. In addition, the voltage generator 210 may generate a string selection line voltage and a ground selection line voltage based on the voltage control signal CTRL_vol. In addition, the voltage generator 210 may generate an erase voltage to be provided to the memory cell array 230.

The address decoder 220 may select one of a plurality of memory planes PL1 to PLN (N is a natural number of 1 or more) of the memory cell array 230, may select one of memory blocks of the selected memory plane, may select one of word lines WL of the selected memory block, and may select one of a plurality of string selection lines SSL.

The memory cell array 230 may be connected to word lines WL, string selection lines SSL, ground selection lines GSL, and bit lines BL. The memory cell array 230 may be connected to the address decoder 220 through word lines WL, string selection lines SSL, and ground selection lines GSs and may be connected to the page buffer circuit 250 through bit lines BL. The memory cell array 230 may include a plurality of memory planes PL1 to PLN.

Each of the plurality of memory planes PL1 to PLN may include a plurality of memory cells and a plurality of selection transistors. Memory cells may be respectively connected to word lines WL, and selection transistors may be respectively connected to string selection lines SSL or ground selection lines GSL. Each of the plurality of memory planes PL1 to PLN may include a plurality of memory blocks, and each of the plurality of memory blocks may correspond to an erase unit. Each of the plurality of memory planes PL1 to PLN may include a plurality of pages, and each of the plurality of pages may correspond to a program or read unit of data in one memory block.

In some example embodiments, respective operations for the plurality of memory planes PL1 to PLN may be performed independently of each other. For example, the operation for the first memory plane PL1 may be performed independently of the operation for the second memory plane PL2.

The control logic circuit 240 may output various control signals for performing program, read, and erase operations on the memory cell array 230 based on the command-address CA. The control logic circuit 240 may provide a row address X_ADDR to the address decoder 220, may provide a column address Y_ADDR to the page buffer circuit 250, and may provide the voltage control signal CTRL_vol to the voltage generator 210. The control logic circuit 240 may be connected to the command-address bus CA_BUS.

The page buffer circuit 250 may include a plurality of page buffers PB1 to PBN. The plurality of page buffers PB1 to PBN may correspond to the plurality of memory planes PL1 to PLN, respectively. The page buffer circuit 250 may operate as a write driver or a sense amplifier depending on an operation mode of the memory device 200. During the read operation, the page buffer circuit 250 may sense the bit line BL of the selected memory cell under control by the control logic circuit 240. The sensed data may be stored in latches provided in the page buffer circuit 250. The page buffer circuit 250 may dump data stored in the latches to the I/O circuit 260 under control by the control logic circuit 240.

The I/O circuit 260 may temporarily store data DQ provided from the outside of the memory device 200. The I/O circuit 260 may temporarily store read data of the memory device 200 and output data to the outside at a designated time point. In addition, the I/O circuit 260 may temporarily store write data provided from the outside and provide data to the page buffer circuit 250 at a designated time point. The I/O circuit 260 may be connected to the data bus DQ_BUS.

The command-address management circuit 270 may include a monitoring circuit 271 and a command-address queue 272. The monitoring circuit 271 may monitor the state of the data bus DQ_BUS. In the present specification, the determining whether the data bus DQ_BUS is in a busy state or an idle state by the monitoring circuit 271 may be referred to as monitoring. For example, when the memory device 200 performs an operation (e.g., write, read, or erase operation) corresponding to a data-related command, the data bus DQ_BUS may be in a busy state. In addition, for example, when the memory device 200 has completed an operation corresponding to a data-related command, the data bus DQ_BUS may be in an idle state. In some example embodiments, the monitoring of the state of the data bus DQ_BUS by the command-address management circuit 270 may be referred to as a polling operation.

The command-address management circuit 270 may check the state of the data bus DQ_BUS through the monitoring circuit 271 and determine whether to store, in the command-address queue 272, the command-address CA received by the control logic circuit 240. The specific description of the command-address management circuit 270 is given below with reference to FIGS. 4A and 4B.

Figure 4A:
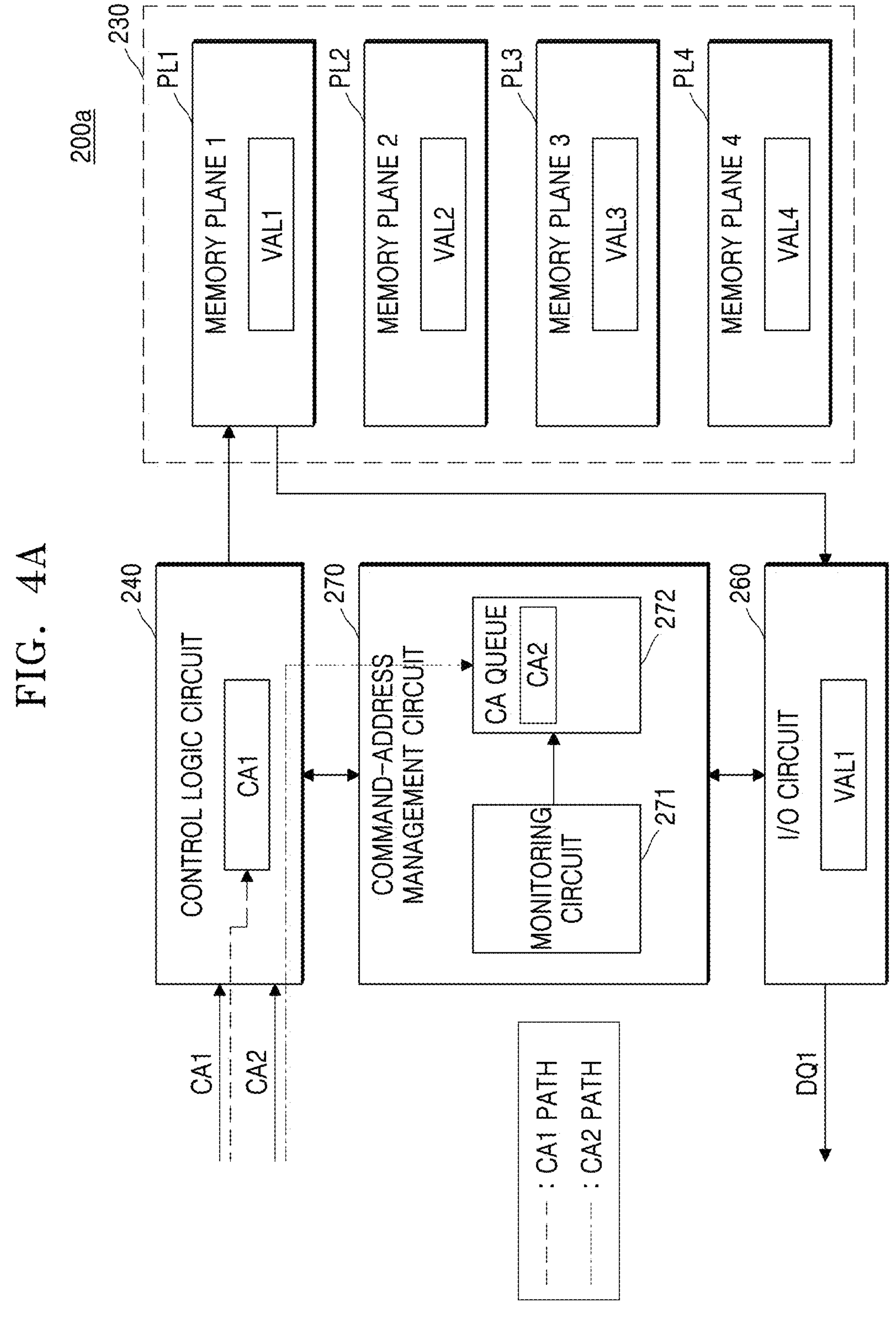
FIGS. 4A and 4B are block diagrams for describing a memory device according to some example embodiments.
Figure 4B:
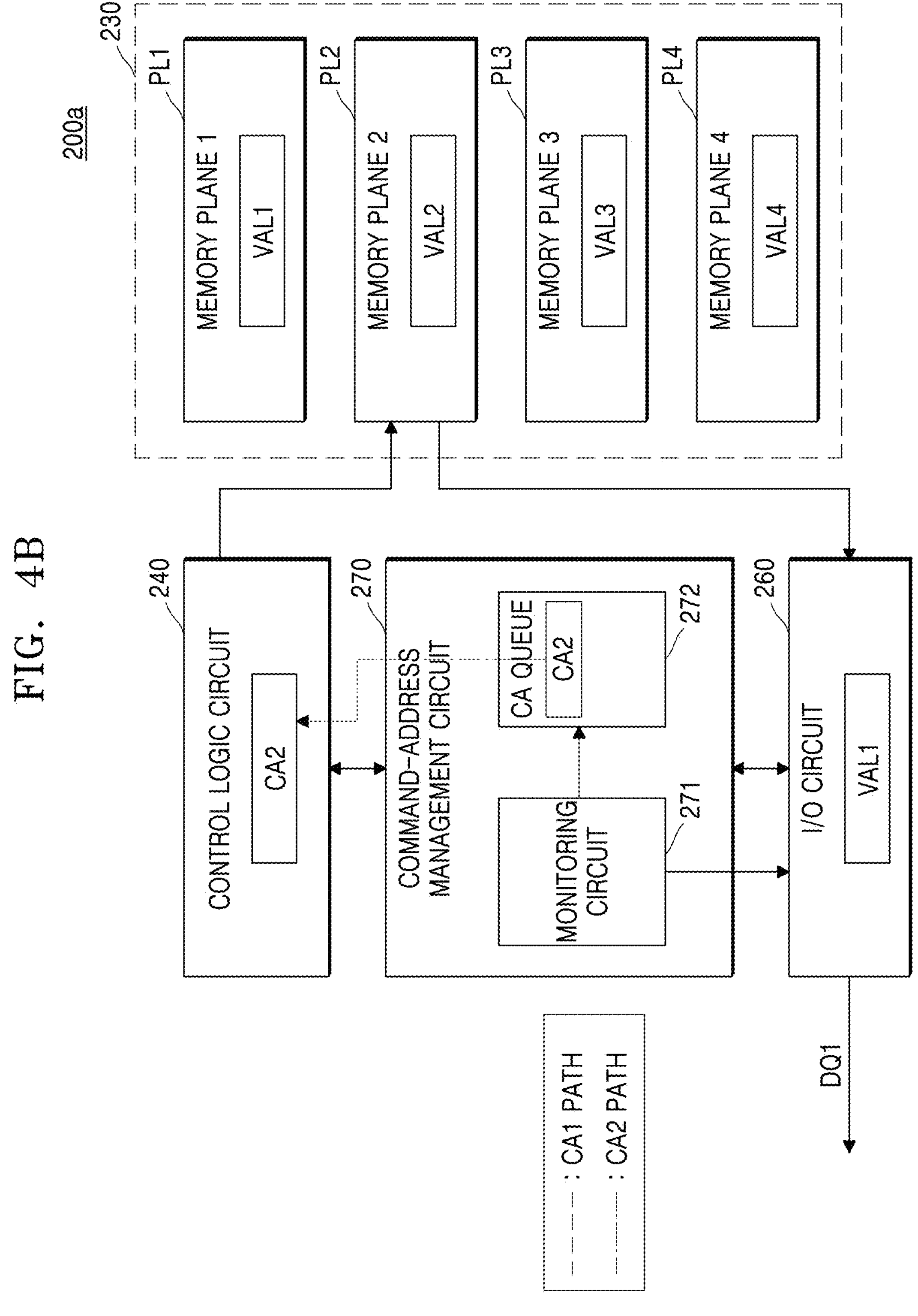

FIGS. 4A and 4B are block diagrams to describe a memory device 200*a* according to some example embodiments. FIGS. 4A to 4B may be described with reference to FIGS. 1 to 3, and redundant descriptions may be omitted.

Referring to FIG. 4A, a memory device 200*a* of FIG. 4A may correspond to the memory devices 200 of FIGS. 1 and 3.

The memory device 200*a* may include a memory cell array 230, a control logic circuit 240, an I/O circuit 260, and a command-address management circuit 270. In FIGS. 4A and 4B, the memory cell array 230 may include first to fourth memory planes PL1 to PL4. The memory cell array 230 including four memory planes is only an example, and the inventive concepts are not limited to four memory planes. That is, the memory cell array 230 may include more or less memory planes. In addition, it is assumed that a first value VAL1 is stored in the first memory plane PL1, a second value VAL2 is stored in the second memory plane PL2, a third value VAL3 is stored in the third memory plane PL3, and a fourth value VAL4 is stored in the fourth memory plane PL4.

The memory controller 100 of FIG. 1 may provide a first command-address CA1 and a second command-address CA2 to the memory device 200*a* of FIG. 4A through the command-address bus CA_BUS of FIG. 1. The control logic circuit 240 may receive the first command-address CA1 and the second command-address CA2. The first command-address CA1 may be a command-address instructing an operation related to the first memory plane PL1, and the second command-address CA2 may be a command-address instructing an operation related to the second memory plane PL2.

In FIGS. 4A and 4B, it is assumed that the first command-address CA1 is received by the control logic circuit 240 before the second command-address CA2, and thus the memory device 200*a* starts performing an operation corresponding to the first command-address CA1. This is for illustration and is not intended to limit the inventive concepts.

In some example embodiments, the control logic circuit 240 may control the memory cell array 230 and the I/O circuit 260 to perform an I/O operation related to the first value VAL1 in order for the I/O circuit 260 to perform an operation corresponding to the first command-address CA1. For example, when the first command-address CA1 is a command-address instructing a read operation for the first value VAL1, the I/O circuit 260 may provide first data DQ1 including the first value VAL1 to the memory controller 100. In this case, the first data DQ1 may be provided to the memory controller 100 through the data bus DQ_BUS. In addition, for example, when the first command-address CA1 is a command-address instructing a write operation for the first value VAL1, the first data DQ1 including the first value VAL1 may be provided from the memory controller 100 to the I/O circuit 260. In this case, the first data DQ1 may be provided to the memory controller 100 through the data bus DQ_BUS.

Since the I/O circuit 260 is performing an I/O operation on the first data DQ1 including the first value VAL1, the monitoring circuit 271 may determine that the data bus DQ_BUS is in a busy state. In this case, the control logic circuit 240 may provide the second command-address CA2 received from the memory controller 100 to the command-address management circuit 270. The command-address management circuit 270 may store, in the command-address queue 272, the second command-address CA2 received from the control logic circuit 240. The second command-address CA2 stored in the command-address queue 272 may wait in the command-address queue 272 until an operation corresponding to the first command-address queue CA1 is completed.

Referring to FIG. 4B, when the I/O circuit 260 completes the I/O operation related to the first data DQ1, the monitoring circuit 271 may determine that the data bus DQ_BUS is in the idle state. This may mean a state in which no data transfers between the memory controller 100 and the memory device 200*a* through the data bus DQ_BUS. Accordingly, the monitoring circuit 271 may control the command-address queue 272 so that the second command-address CA2 stored in the command-address queue 272 is dequeued.

The command-address management circuit 270 may provide the second command-address CA2 to the control logic circuit 240 in response to the state of the data bus DQ_BUS being an idle state.

The control logic circuit 240 may control the memory cell array 230 and the I/O circuit 260 so that the I/O circuit 260 performs an I/O operation related to the second value VAL2 in order to perform an operation corresponding to the second command-address CA2. For example, when the second command-address CA2 is a command-address instructing a read operation for the second value VAL2, the I/O circuit 260 may provide the second data DQ2 including the second value VAL2 to the memory controller 100. In this case, the second data DQ2 may be provided to the memory controller 100 through the data bus DQ_BUS. In addition, for example, when the second command-address CA2 is a command-address instructing a write operation for the second value VAL2, the second data DQ2 including the second value VAL2 may be provided from the memory controller 100 to the I/O circuit 260. In this case, the second data DQ2 may be provided to the memory controller 100 through the data bus DQ_BUS.

Figure 5:
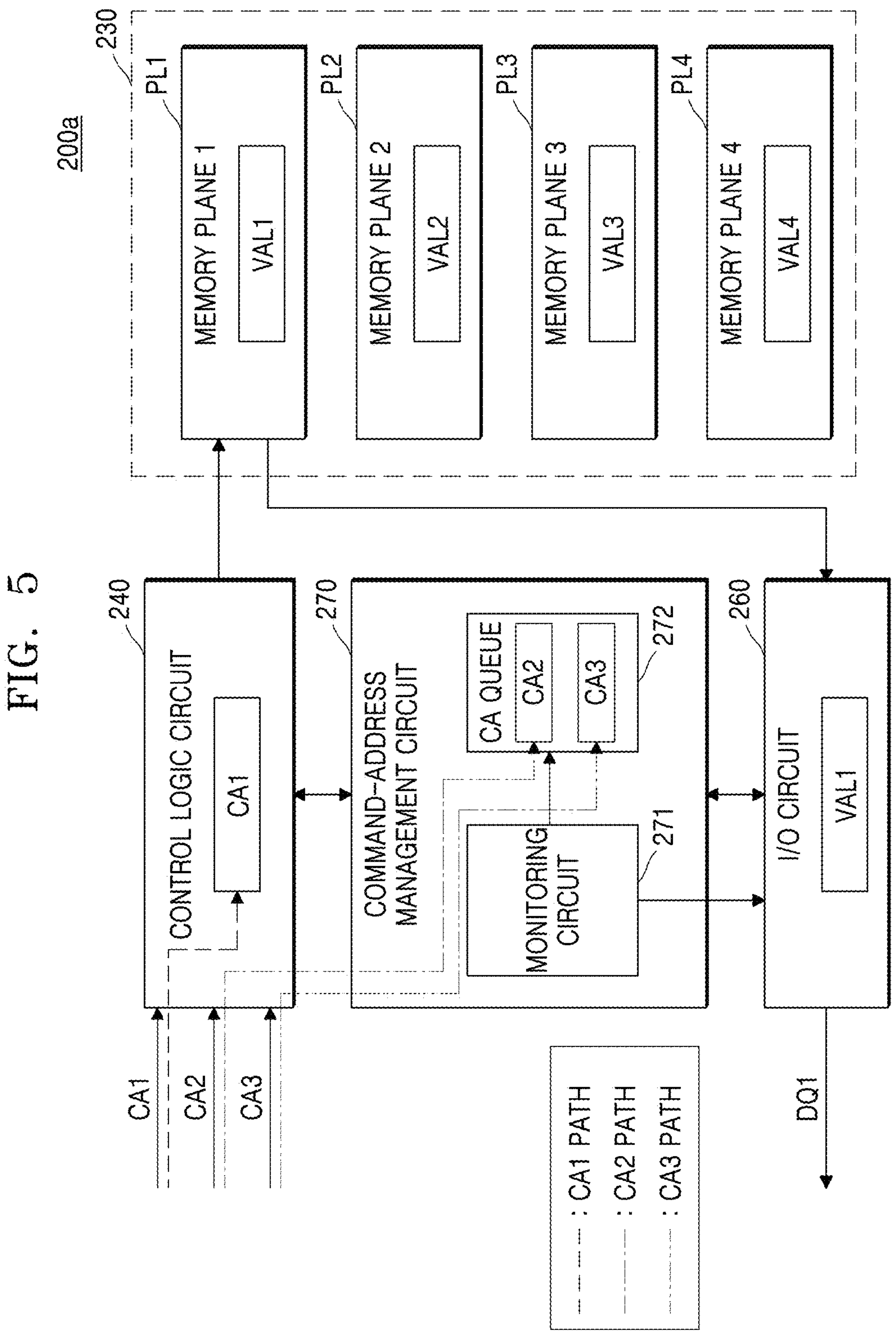
FIG. 5 is a block diagram for describing a memory device according to some example embodiments.

FIG. 5 is a block diagram for describing a memory device 200*a* according to some example embodiments. Specifically, FIG. 5 is a block diagram for describing that the command-address queue 272 stores two or more command-addresses. FIG. 5 may be described with reference to FIGS. 1 to 4B, and redundant descriptions may be omitted.

Referring to FIG. 5, the memory controller 100 of FIG. 1 may provide a first command-address CA1, a second command-address CA2, and a third command-address CA3 to the memory device 200*a* through the command-address bus CA_BUS. The control logic circuit 240 may receive the first command-address CA1, the second command-address CA2, and the third command-address CA3. The first command-address CA1 may be a command-address instructing an operation related to the first memory plane PL1, the second command-address CA2 may be a command-address instructing an operation related to the second memory plane PL2, and the third command-address CA3 may be a command-address instructing an operation related to the third memory plane PL3.

In some example embodiments, the depth of the command-address queue 272 may be greater than or equal to 2. In other words, the number of command-addresses that may be stored in the command-address queue 272 may be two or more.

In FIG. 5, it is assumed that the first command-address CA1 is received by the control logic circuit 240 before the second command-address CA2, and the second command-address CA2 is received by the control logic circuit 240 before the third command-address CA3. This is for illustration and is not intended to limit the inventive concepts.

Since the first command-address CA1 is first received by the control logic circuit 240, the memory device 200*a* may perform an operation corresponding to the first command-address CA1. The control logic circuit 240 may control the memory cell array 230 and the I/O circuit 260 so that the I/O circuit 260 performs an I/O operation related to the first value VAL1 in order to perform an operation corresponding to the first command-address CA1. Since the I/O circuit 260 is performing an I/O operation on the first data DQ1 including the first value VAL1, the monitoring circuit 271 may determine that the data bus DQ_BUS is in a busy state. In this case, the control logic circuit 240 may provide the second command-address CA2 and the third command-address CA3 received from the memory controller 100 to the command-address management circuit 270. The command-address management circuit 270 may store, in the command-address queue 272, the second command-address CA2 and the third command-address CA3 received from the control logic circuit 240. The second command-address CA2 stored in the command-address queue 272 may wait in the command-address queue 272 until an operation corresponding to the first command-address queue CA1 is completed. The third command-address CA3 stored in the command-address queue 272 may wait in the command-address queue 272 until the operations corresponding to the first command-address queue CA1 and the second command-address CA2 are completed.

Figure 6:
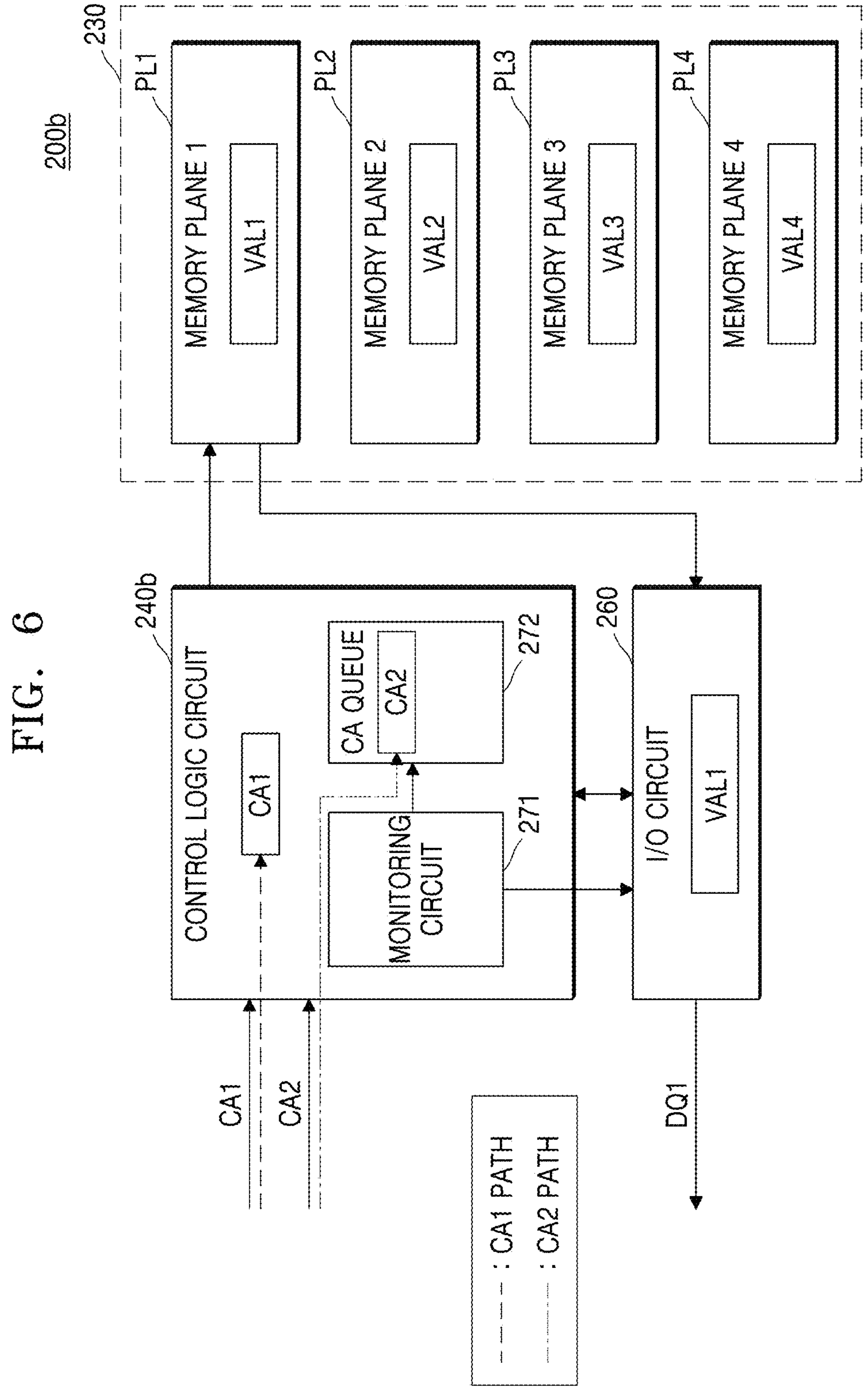
FIG. 6 is a block diagram for describing a memory device according to some example embodiments.

FIG. 6 is a block diagram for describing a memory device 200*b* according to some example embodiments. FIG. 6 may be described with reference to FIGS. 1 to 5, and redundant descriptions may be omitted.

Referring to FIG. 6, the memory device 200*b* may include a memory cell array 230, a control logic circuit 240*b*, and an I/O circuit 260. Unlike the memory device 200*a* of FIGS. 4A to 5, the memory device 200*b* of FIG. 6 may be configured such that the control logic circuit 240*b* includes a monitoring circuit 271 and a command-address queue 272.

The control logic circuit 240*b* may receive the first command-address CA1 and the second command-address CA2. In FIG. 6, it is assumed that the first command-address CA1 is received by the control logic circuit 240*b* before the second command-address CA2. This is only an example and is not intended to limit the inventive concepts.

In some example embodiments, the control logic circuit 240*b* may control the memory cell array 230 and the I/O circuit 260 to perform an I/O operation related to the first value VAL1 in order for the I/O circuit 260 to perform an operation corresponding to the first command-address CA1. Since the I/O circuit 260 is performing an I/O operation on the first data DQ1 including the first value VAL1, the control logic circuit 240*b* may determine through the monitoring circuit 271 that the data bus DQ_BUS is in a busy state. In this case, the control logic circuit 240*b* may store, in the command-address queue 272, the second command-address CA2 received from the memory controller 100. The second command-address CA2 stored in the command-address queue 272 may wait in the command-address queue 272 until an operation corresponding to the first command-address queue CA1 is completed.

Figure 7:
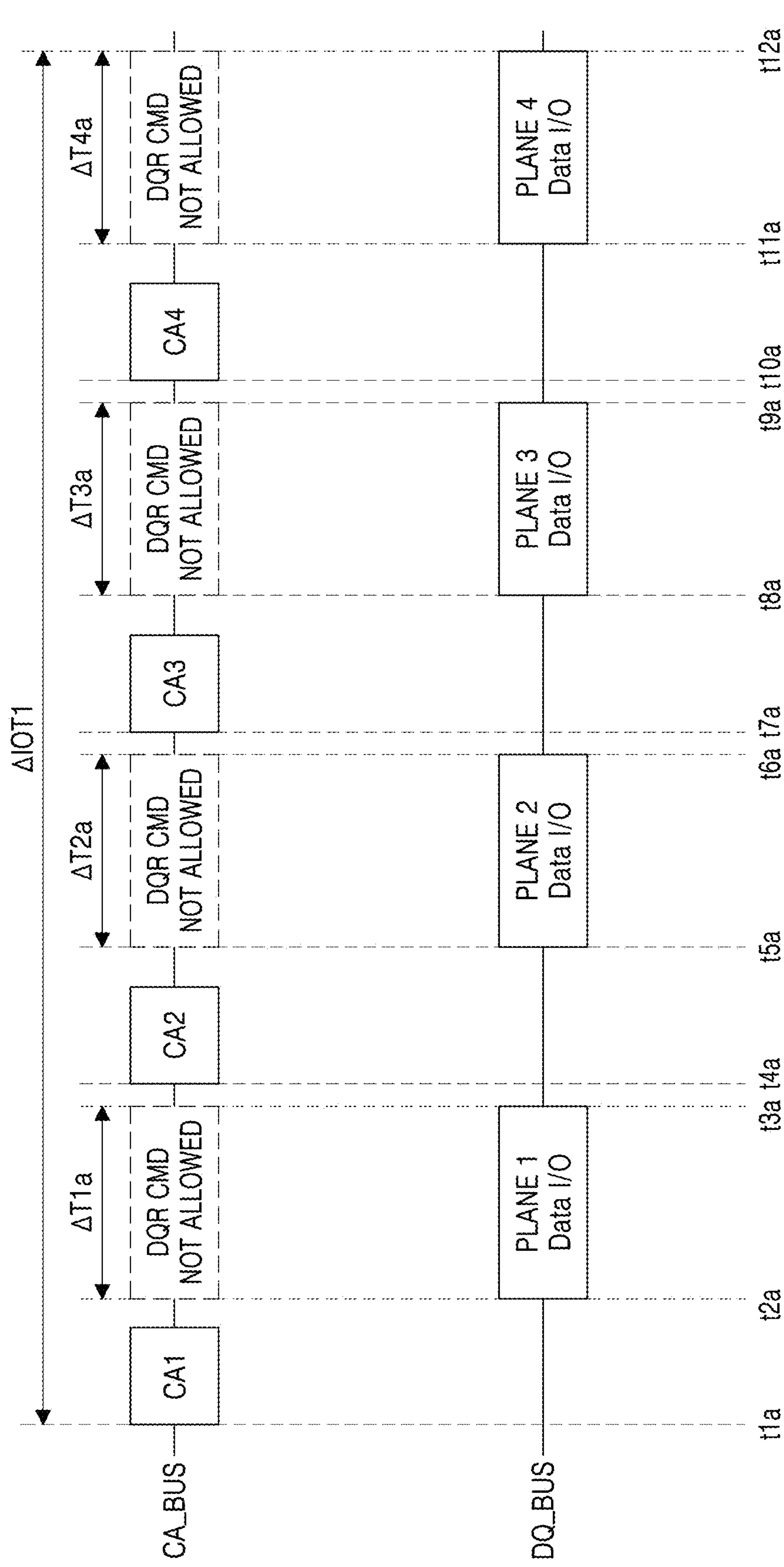
FIG. 7 is a diagram illustrating an operation of a memory device according to a comparative example.

FIG. 7 is a diagram illustrating an operation of a memory device according to a comparative example. The memory device of FIG. 7 may refer to a memory device according to a comparative example that does not include the command-address management circuit 270 illustrated in FIG. 1. In FIG. 7, for convenience of description, the components other than the command-address management circuit 270 are described using the same reference numerals as those of the example embodiments of the memory device 200.

At a first time point t1a, the first command-address CA1 may be provided to the control logic circuit 240 through the command-address bus CA_BUS.

At a second time point t2a, the control logic circuit 240 may start an operation related to the first command-address CA1. That is, the memory device 200 may perform an I/O operation related to the first memory plane PL1 through the I/O circuit 260 under control by the control logic circuit 240. Such an I/O operation may be completed at a third time point t3a. Therefore, a first time period ΔT1a, defined from the second time point t2a to the third time point t3a, may be a time period in which an operation corresponding to a command-address different from the first command-address CA1 is not allowed. Accordingly, a command-address different from the first command-address CA1 may not be received by the control logic circuit 240 during the first time period ΔT1a.

At a fourth time point t4a, the second command-address CA2 may be provided to the control logic circuit 240 through the command-address bus CA_BUS.

At a fifth time point t5a, the control logic circuit 240 may start an operation related to the second command-address CA2. That is, the memory device 200 may perform an I/O operation related to the second memory plane PL2 through the I/O circuit 260 under control by the control logic circuit 240. Such an I/O operation may be completed at a sixth time point t6a. Therefore, a second time period ΔT2a, defined from the fifth time point t5a to the sixth time point t6a, may be a time period in which an operation corresponding to a command-address different from the second command-address CA2 is not allowed. Accordingly, a command-address different from the second command-address CA2 may not be received by the control logic circuit 240 during the second time period ΔT2a.

At a seventh time point t7a, the third command-address CA3 may be provided to the control logic circuit 240 through the command-address bus CA_BUS.

At an eighth time point t8a, the control logic circuit 240 may start an operation related to the third command-address CA3. That is, the memory device 200 may perform an I/O operation related to the third memory plane PL3 through the I/O circuit 260 under control by the control logic circuit 240. Such an I/O operation may be completed at a ninth time point t9a. Therefore, a third time period ΔT3a, defined from the eighth time point t8a to the ninth time point t9a, may be a time period in which an operation corresponding to a command-address different from the third command-address CA3 is not allowed. Accordingly, a command-address different from the third command-address CA3 may not be received by the control logic circuit 240 during the third time period ΔT3a.

At a tenth time point t10a, the fourth command-address CA4 may be provided to the control logic circuit 240 through the command-address bus CA_BUS.

At an eleventh time point t11a, the control logic circuit 240 may start an operation related to the fourth command-address CA4. That is, the memory device 200 may perform an I/O operation related to the fourth memory plane PL4 through the I/O circuit 260 under control by the control logic circuit 240. Such an I/O operation may be completed at a twelfth time point t12a. Therefore, a fourth time period ΔT4a, defined from the eleventh time point t11a to the twelfth time point t12a, may be a time period in which an operation corresponding to a command-address different from the fourth command-address CA4 is not allowed. Accordingly, a command-address different from the fourth command-address CA4 may not be received by the control logic circuit 240 during the fourth time period ΔT4a.

A time period from the first time point t1a to the twelfth time point t12a may be referred to as a first I/O operation time period ΔIOT1. Since the memory device according to the comparative example may not receive another command-address while performing an I/O operation corresponding to any one command-address as described above, there may be a problem that the first I/O operation time period ΔIOT1 is lengthened.

FIG. 8 is a diagram illustrating a method of operating a memory device 200, according to some example embodiments. FIG. 8 may be described with reference to FIGS. 1 to 4B, and redundant descriptions may be omitted.

Referring to FIG. 8, at a first time point t1b, the first command-address CA1 may be provided to the control logic circuit 240 through the command-address bus CA_BUS.

At a second time point t2b, the control logic circuit 240 may start an operation related to the first command-address CA1. That is, the memory device 200 may perform an I/O operation related to the first memory plane PL1 through the I/O circuit 260 under control by the control logic circuit 240. Such an I/O operation may be completed at a fourth time point t4b. Therefore, a first time period ΔT1b, defined from the second time point t2b to the fourth time point t4b, may be a time period in which an operation corresponding to a command-address different from the first command-address CA1 is not allowed. In the first time period ΔT1b, the monitoring circuit 271 may monitor the state of the data bus DQ_BUS and may determine that the data bus DQ_BUS is in a busy state.

At a third time point t3b, the second command-address CA2 may be provided to the control logic circuit 240 through the command-address bus CA_BUS. Since the third time point t3b belongs to the first time period ΔT1b, the control logic circuit 240 may provide the second command-address CA2 to the command-address management circuit 270. The command-address management circuit 270 may store the second command-address CA2 in the command-address queue 272.

At a fourth time point t4b, the I/O operation related to the first memory plane PL1 may be completed. In this case, the monitoring circuit 271 may monitor the state of the data bus DQ_BUS and may determine that the data bus DQ_BUS is in an idle state. Since the data bus DQ_BUS is in an idle state, the command-address management circuit 270 may provide the second command-address CA2 stored in the command-address queue 272 to the control logic circuit 240 by dequeuing the second command-address CA2.

At a fifth time point t5b, the control logic circuit 240 may start an operation related to the second command-address CA2. That is, the memory device 200 may perform an I/O operation related to the second memory plane PL2 through the I/O circuit 260 under control by the control logic circuit 240. Such an I/O operation may be completed at a seventh time point t7b. Therefore, a second time period ΔT2b, defined from the fifth time point t5b to the seventh time point t7b, may be a time period in which an operation corresponding to a command-address different from the second command-address CA2 is not allowed. In the second time period ΔT2b, the monitoring circuit 271 may monitor the state of the data bus DQ_BUS and may determine that the data bus DQ_BUS is in a busy state.

At a sixth time point t6b, the third command-address CA3 may be provided to the control logic circuit 240 through the command-address bus CA_BUS. Since the sixth time point t6b belongs to the second time period ΔT2b, the control logic circuit 240 may provide the third command-address CA3 to the command-address management circuit 270. The command-address management circuit 270 may store the third command-address CA3 in the command-address queue 272.

At a seventh time point t7b, the I/O operation related to the second memory plane PL2 may be completed. In this case, the monitoring circuit 271 may monitor the state of the data bus DQ_BUS and may determine that the data bus DQ_BUS is in an idle state. Since the data bus DQ_BUS is in an idle state, the command-address management circuit 270 may provide the third command-address CA3 stored in the command-address queue 272 to the control logic circuit 240 by dequeuing the third command-address CA3.

At an eighth time point t8b, the control logic circuit 240 may start an operation related to the third command-address CA3. That is, the memory device 200 may perform an I/O operation related to the third memory plane PL3 through the I/O circuit 260 under control by the control logic circuit 240. Such an I/O operation may be completed at a tenth time point t10b. Therefore, a third time period ΔT3b, defined from the eighth time point t8b to the tenth time point t10b, may be a time period in which an operation corresponding to a command-address different from the third command-address CA3 is not allowed. In the third time period ΔT3b, the monitoring circuit 271 may monitor the state of the data bus DQ_BUS and may determine that the data bus DQ_BUS is in a busy state.

At a ninth time point t9b, the fourth command-address CA4 may be provided to the control logic circuit 240 through the command-address bus CA_BUS. Since the ninth time point t9b belongs to the third time period ΔT3b, the control logic circuit 240 may provide the fourth command-address CA4 to the command-address management circuit 270. The command-address management circuit 270 may store the fourth command-address CA4 in the command-address queue 272.

At a tenth time point t10b, the I/O operation related to the third memory plane PL3 may be completed. In this case, the monitoring circuit 271 may monitor the state of the data bus DQ_BUS and may determine that the data bus DQ_BUS is in an idle state. Since the data bus DQ_BUS is in an idle state, the command-address management circuit 270 may provide the fourth command-address CA4 stored in the command-address queue 272 to the control logic circuit 240 by dequeuing the fourth command-address CA4.

At an eleventh time point t11b, the control logic circuit 240 may start an operation related to the fourth command-address CA4. That is, the memory device 200 may perform an I/O operation related to the fourth memory plane PL4 through the I/O circuit 260 under control by the control logic circuit 240. Such an I/O operation may be completed at a twelfth time point t12b. Therefore, a fourth time period ΔT4b, defined from the eleventh time point t11b to the twelfth time point t12b, may be a time period in which an operation corresponding to a command-address different from the first command-address CA1 is not allowed. In the fourth time period ΔT4b, the monitoring circuit 271 may monitor the state of the data bus DQ_BUS and may determine that the data bus DQ_BUS is in a busy state.

At the twelfth time point t12b, the I/O operation related to the fourth memory plane PL4 may be completed. In this case, the monitoring circuit 271 may monitor the state of the data bus DQ_BUS and may determine that the data bus DQ_BUS is in an idle state.

While FIG. 8 depicts each subsequent command address CA2, CA3, and CA4 as being received during the time period corresponding to the previous time period (e.g. ΔT1b, ΔT2b, and ΔT3b respectively), the example embodiments are not limited thereto. For example, multiple command addresses may be stored in the command-address queue 272 in an instance of time as depicted in FIG. 5. For example, the third command-address CA3 may be provided to the control logic circuit 240 through the command address bus CA_BUS prior to the time period ΔT2b. The control logic circuit 240 may provide the third command-address CA3 to the command-address management circuit 270. The command-address management circuit 270 may store the third command-address CA3 in the command-address queue 272 with the second command-address CA2.

A time period from the first time point t1b to the twelfth time point t12b may be referred to as a second I/O operation time period ΔIOT2. Unlike the comparative example configured not to receive a command-address when t the data bus DQ_BUS is in a busy state, the memory device 200 according to some example embodiments may store, in the command-address queue 272, the command-address provided to the memory device 200. Accordingly, the second I/O operation time period ΔIOT2 may be shorter than the first I/O operation time period ΔIOT1 of FIG. 7. That is, efficiency of I/O operations performed between the memory device 200 and the memory controller 100 may increase.

Figure 9:
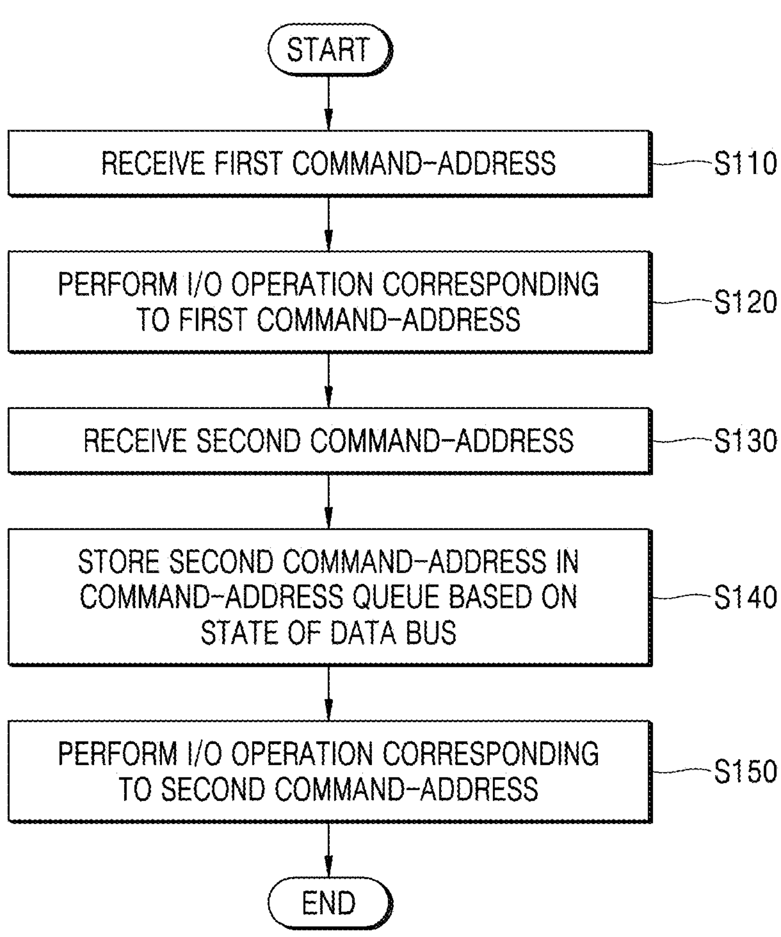
FIG. 9 is a flowchart illustrating a method of operating a memory device, according to some example embodiments.

FIG. 9 is a flowchart illustrating a method of operating a memory device 200, according to some example embodiments. FIG. 9 may be described with reference to FIGS. 1 to 8, and redundant descriptions may be omitted.

Referring to FIG. 9, in operation S110, the memory device 200 may receive a first command-address CA1.

In some example embodiments, the memory device 200 may receive the first command-address CA1 through the control logic circuit 240, and the first command-address CA1 may be transmitted to the memory device 200 through the command-address bus CA_BUS connecting the memory device 200 to the memory controller 100.

In operation S120, the memory device 200 may perform an I/O operation corresponding to the first command-address CA1.

In some example embodiments, the control logic circuit 240 may output a control signal for performing an I/O operation on the first memory plane PL1 in response to the first command-address CA1.

In some example embodiments, the I/O circuit 260 may perform an I/O operation related to the first data DQ1 corresponding to the first command-address CA1. The first data DQ1 may be transmitted and received between the memory controller 100 and the memory device 200 through the data bus DQ_BUS. The command-address management circuit 270 may monitor the state of the data bus DQ_BUS through the monitoring circuit 271, and in this case, the data bus DQ_BUS may be in a busy state.

In operation S130, the memory device 200 may receive the second command-address CA2.

In some example embodiments, the memory device 200 may receive the second command-address CA2 through the control logic circuit 240, and the second command-address CA2 may be transmitted to the memory device 200 through the command-address bus CA_BUS connecting the memory device 200 to the memory controller 100.

In operation S140, the memory device 200 may check the state of the data bus DQ_BUS in response to the reception of the second command-address CA2. The memory device 200 may store the second command-address CA2 in the command-address queue 272 based on the state of the data bus DQ_BUS. A specific description of operation S140 is given below with reference to FIG. 10.

In some example embodiments, when the second command-address CA2 is received and the data bus DQ_BUS is in a busy state, the control logic circuit 240 may provide the second command-address CA2 to the command-address management circuit 270. The command-address management circuit 270 may store the second command-address CA2 in the command-address queue 272.

In some example embodiments, in the case that the data bus DQ_BUS is in an idle state when the second command-address CA2 is received, the control logic circuit 240 may perform an operation indicated by the second command-address CA2 without providing the second command-address CA2 to the command-address management circuit 270.

In operation S150, the memory device 200 may perform an I/O operation corresponding to the second command-address CA2.

In some example embodiments, the time point at which the memory device 200 performs the I/O operation corresponding to the second command-address CA2 may be after the time point at which the memory device 200 completes the I/O operation corresponding to the first command-address CA1. In this case, the data bus DQ_BUS may be in an idle state.

Figure 10:
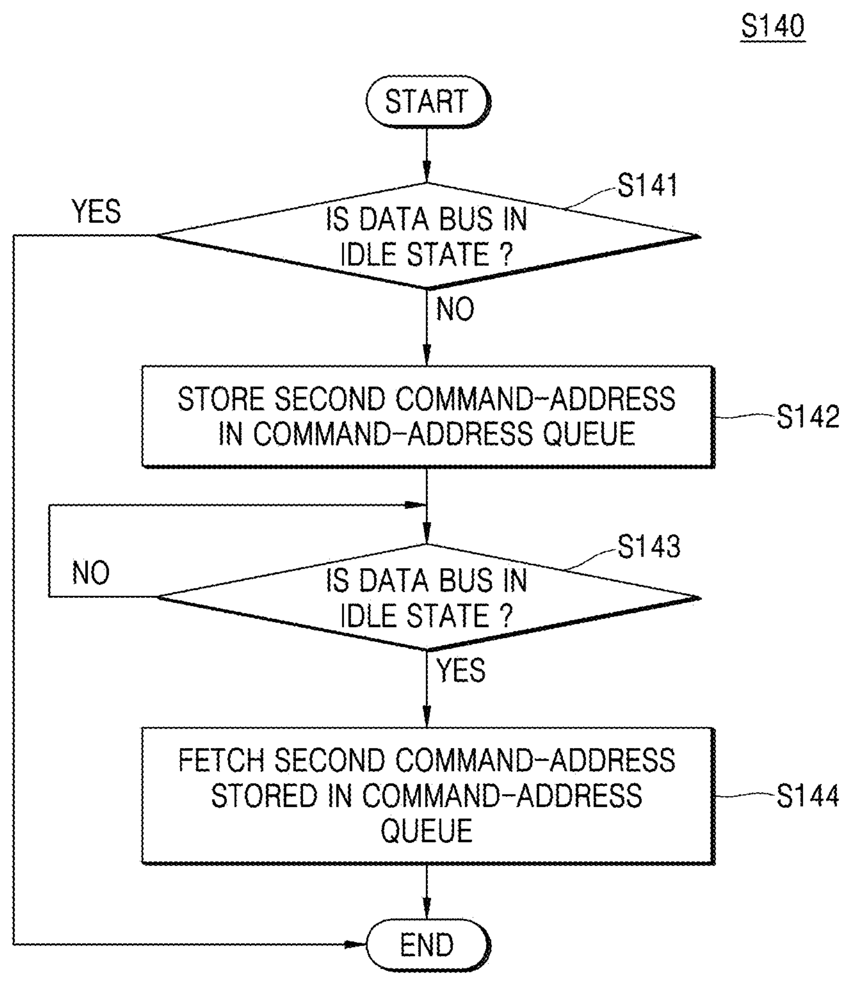
FIG. 10 is a flowchart illustrating a method of operating a memory device, according to some example embodiments.

FIG. 10 is a flowchart illustrating a method of operating a memory device 200, according to some example embodiments. Specifically, FIG. 10 is a flowchart for describing operation S140 of FIG. 9 in detail. FIG. 10 may be described with reference to FIGS. 1 to 9, and redundant descriptions may be omitted.

Referring to FIG. 10, in operation S141, the memory device 200 may determine whether the data bus DQ_BUS is in an idle state.

In some example embodiments, when the data bus DQ_BUS is in an idle state, operation S150 of FIG. 9 may be performed.

In operation S142, when the data bus DQ_BUS is not in an idle state (e.g., when the data bus DQ_BUS is in a busy state), the memory device 200 may store the second command-address CA2 in the command-address queue 272.

In some example embodiments, when the data bus DQ_BUS is in a busy state, the control logic circuit 240 may provide the second command-address CA2 to the command-address management circuit 270. The command-address management circuit 270 may store the second command-address CA2 in the command-address queue 272.

In operation S143, the memory device 200 may determine whether the data bus DQ_BUS is in an idle state.

In some example embodiments, when the memory device 200 performs an I/O operation related to the first data DQ1 corresponding to the first command-address CA1, the data bus DQ_BUS may still be in a busy state. In this case, the second command-address CA2 may wait in the command-address queue 272 until the I/O operation is completed.

In some example embodiments, when the memory device 200 completes an I/O operation related to the first data DQ1 corresponding to the first command-address CA1, the data bus DQ_BUS may still be in an idle state. Accordingly, the monitoring circuit 271 may determine that the data bus DQ_BUS is in an idle state, and the memory device 200 may perform the next operation S144.

In operation S144, the memory device 200 may fetch the second command-address CA2 stored in the command-address queue 272. In some example embodiments, the command-address management circuit 270 may dequeue the second command-address CA2 in the command-address queue 272 and provide the dequeued second command-address CA2 to the control logic circuit 240.

Figure 11:
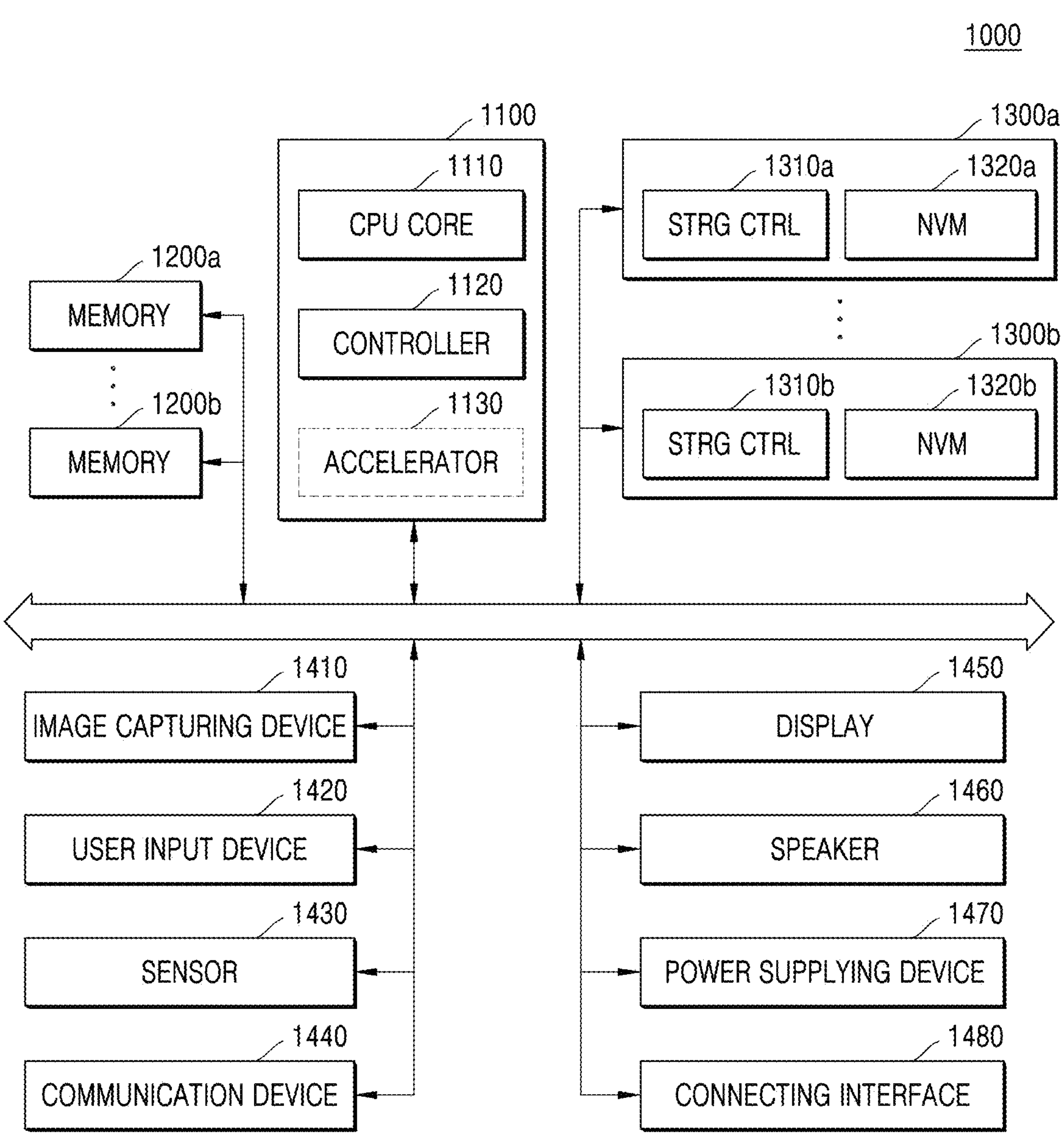
FIG. 11 is a block diagram illustrating a system including a memory device according to some example embodiments.

FIG. 11 is a block diagram illustrating a system 1000 including a memory device according to some example embodiment.

The system 1000 of FIG. 11 may include a mobile system, such as a mobile phone, a smartphone, a tablet personal computer (PC), a wearable device, a healthcare device, or an Internet of Things (IoT) device. However, the system 1000 of FIG. 11 is not necessarily limited to a mobile system and may include a PC, laptop computer, server, media player, or automotive device such as a navigation.

Referring to FIG. 11, the system 1000 may include a main processor 1100, memories 1200*a* and 1200*b*, and storage devices 1300*a* and 1300*b*. In addition, the system 1000 may include one or more of an image capturing device 1410, a user input device 1420, a sensor 1430, a communication device 1440, a display 1450, a speaker 1460, a power supplying device 1470, and a connecting interface 1480. In this case, each of the components constituting the system 1000 of FIG. 11, that is, the main processor 1100, the memories 1200*a* and 1200*b*, the storage devices 1300*a* and 1300*b*, the image capturing device 1410, the user input device 1420, the sensor 1430, the communication device 1440, the display 1450, the speaker 1460, the power supplying device 1470, and the connection interface 1480, may be implemented using example embodiments described above with reference to FIGS. 1 to 10.

The main processor 1100 may control the overall operation of the system 1000, more specifically, the operation of other components constituting the system 1000. The main processor 1100 may be implemented as a general-purpose processor, a dedicated processor, an application processor, or the like.

The main processor 1100 may include one or more CPU cores 1110 and may further include a controller 1120 for controlling the memories 1200*a* and 1200*b* and/or the storage devices 1300*a* and 1300*b*. According to some example embodiments, the main processor 1100 may further include an accelerator 1130, which is a dedicated circuit for high-speed data operations such as an artificial intelligence (AI) data operation. The accelerator 1130 may include a graphics processing unit (GPU), a neural processing unit (NPU), and/or a data processing unit (DPU) and may be implemented as a separate chip physically independent of other components of the main processor 1100.

The memories 1200*a* and 1200*b* may be used as main memory devices of the system 1000 and may include volatile memories, such as SRAM and/or DRAM, but may also include nonvolatile memories, such as flash memory, PRAM and/or RRAM. The memories 1200*a* and 1200*b* may be implemented in the same package as the main processor 1100.

The storage devices 1300*a* and 1300*b* may function as nonvolatile storage devices that store data regardless of whether power is supplied to the storage devices, and may have a relatively large storage capacity compared to the memories 1200*a* and 1200*b*. The storage devices 1300*a* and 1300*b* may include storage controllers 1310*a* and 1310*b* and nonvolatile memories (NVM) 1320*a* and 1320*b* that store data under control by the storage controllers 1310*a* and 1310*b*. The nonvolatile memories 1320*a* and 1320*b* may include flash memory having a 2-dimensional (2D) structure or a 3-dimensional (3D) Vertical NAND (V-NAND) structure but may include other types of nonvolatile memories such as PRAM and/or RRAM.

The storage devices 1300*a* and 1300*b* may be included in the system 1000 by being physically separate from the main processor 1100, or may be implemented in the same package as the main processor 1100. In addition, the storage devices 1300*a* and 1300*b* may be detachably combined with other components of the system 1000 through an interface such as the connecting interface 1480, which is described below, by having a form such as a solid state device (SSD) or a memory card. The storage devices 1300*a* and 1300*b* may be devices to which standard protocols such as UFS, eMMC, or nonvolatile memory express (NVMe) are applied, but are not necessarily limited thereto.

The image capturing device 1410 may capture a still image or a moving image and may include a camera, a camcorder, and/or a webcam.

The user input device 1420 may receive various types of data input from a user of the system 1000 and may include a touch pad, a keypad, a keyboard, a mouse, and/or a microphone.

The sensor 1430 may detect various types of physical quantities that may be obtained from the outside of the system 1000 and convert the detected physical quantities into electrical signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals to and from other devices outside the system 1000 according to various communication protocols. The communication device 1440 may be implemented by including an antenna, a transceiver, and/or a modem.

The display 1450 and the speaker 1460 may function as output devices that output visual information and auditory information to users of the system 1000, respectively.

The power supplying device 1470 may appropriately convert power supplied from a battery (not shown) embedded in the system 1000 and/or an external power source into the system 1000 and supply the power to each component of the system 1000.

The connecting interface 1480 may provide a connection between the system 1000 and an external device connected to the system 1000 and be capable of transmitting and receiving data to and from the system 1000. The connecting interface 1480 may be implemented in a variety of interface methods such as Advanced Technology Attachment (ATA), Serial ATA (SATA), External SATA (e-SATA), Small Computer Small Shop Interface (SCSI), Serial Attached SCSI (SAS), Peripheral Component Interconnect (PCI), PCI express (PCIe), NVMe, IEEE 1394, universal serial bus (USB), Secure Digital (SD) card interface, MMC, eUFS, Compact Flash (CF) card interface, and/or the like.

Figure 12:
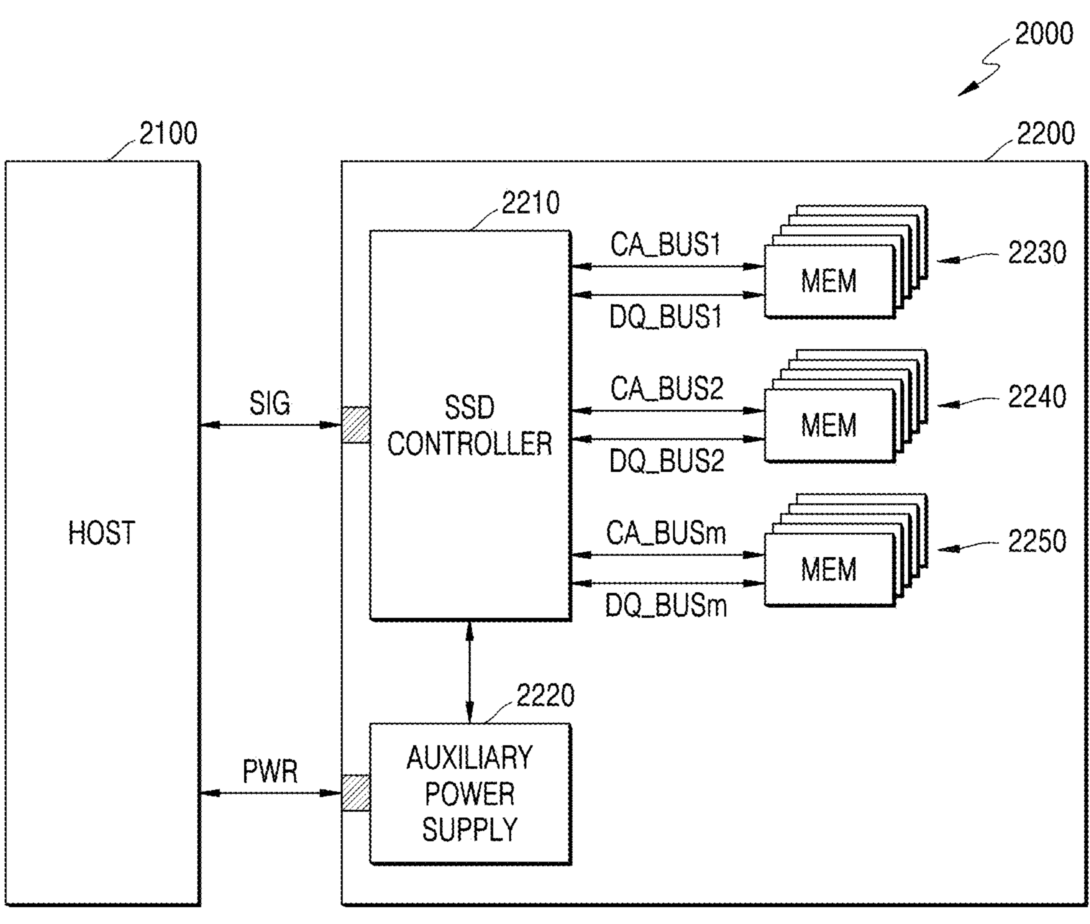
FIG. 12 is a block diagram illustrating an example in which a storage device according to embodiments is applied to a solid state drive (SSD) system.

FIG. 12 is a block diagram illustrating an example in which a storage device according to some example embodiments is applied to an SSD system 2000.

Referring to FIG. 12, the SSD system 2000 may include a host 2100 and an SSD 2200. The SSD 2200 transmits and receives signals SIG to and from the host 2100 through a signal connector and receives power PWR through a power connector. The SSD 2200 may include an SSD controller 2210, an auxiliary power supply 2220, and memory devices 2230, 2240, and 2250. The memory devices 2230, 2240, and 2250 may each be vertically stacked NAND flash memory devices. In this case, the SSD controller 2210, the auxiliary power supply 2220, and the memory devices 2230, 2240, and 2250 may be implemented using some example embodiments described above with reference to FIGS. 1 to 10.

The SSD controller 2210 may provide a command-address to the memory device 2230 through a first command-address bus CA_BUS1. The SSD controller 2210 may transmit and receive data to and from the memory device 2230 through a first data bus DQ_BUS1. The SSD controller 2210 may provide a command-address to the memory device 2240 through a second command-address bus CA_BUS2. The SSD controller 2210 may transmit and receive data to and from the memory device 2240 through a second data bus DQ_BUS2. The SSD controller 2210 may provide a command-address to the memory device 2250 through an m-th command-address bus CA_BUSm (m is a natural number greater than or equal to 3). The SSD controller 2210 may exchange data with the memory device 2250 through the m-th data bus DQ_BUSm.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While the inventive concepts have been particularly shown and described with reference to some example embodiments thereof, it will be understood that various changes in form and details may be made therein without departing from the spirit and scope of the following claims.

What is claimed is:

1. A memory device comprising:
- a memory cell array including a first memory plane and a second memory plane;
- a control logic circuit connected to a first bus, the control logic circuit configured to receive a first command-address and a second command-address from an external device;
- an input/output (I/O) circuit connected to a second bus, the I/O circuit configured to transmit and receive data to and from the external device; and
- a command-address management circuit configured to receive the second command-address from the control logic circuit based on a state of the second bus, wherein
- the command-address management circuit includes,
  - a command-address queue configured to store the second command-address, and
  - a monitoring circuit configured to monitor the state of the second bus.

2. The memory device of claim 1, wherein
- the first command-address instructs an I/O operation for the first memory plane, and
- the second command-address instructs an I/O operation for the second memory plane.

3. The memory device of claim 1, wherein
- the memory device is configured to transmit first data and second data through the I/O circuit,
- the first data includes a first value stored in the first memory plane,
- the second data includes a second value stored in the second memory plane, and the second data is transmitted after the transmission of the first data is completed.

4. The memory device of claim 1, wherein the memory device is configured to receive first data and second data through the I/O circuit, the first data is stored in the first memory plane, the second data is stored in the second memory plane, and the second data is received after the reception of the first data is completed.

5. The memory device of claim 1, wherein the monitoring circuit is configured to determine the second bus is in a busy state in response to the I/O circuit performing an I/O operation related to first data corresponding to the first command-address.

6. The memory device of claim 1, wherein the monitoring circuit is configured to determine the second bus is in an idle state in response to the I/O circuit completing an operation related to first data corresponding to the first command-address.

7. The memory device of claim 1, wherein the I/O circuit is configured to perform an I/O operation related to second data corresponding to the second command-address after an I/O operation related to first data corresponding to the first command-address is completed.

8. The memory device of claim 1, wherein the command-address management circuit is configured to store the second command-address in the command-address queue in response to the I/O circuit performing an I/O operation related to first data corresponding to the first command-address.

9. The memory device of claim 8, further comprising a third memory plane, wherein the control logic circuit is configured to receive a third command-address from the external device through the first bus, the third command-address instructing an I/O operation for the third memory plane, and the command-address management circuit is configured to store the third command-address in the command-address queue in response to the I/O circuit performing the I/O operation related to the first data corresponding to the first command-address.

10. The memory device of claim 1, wherein the command-address management circuit is configured to provide the second command-address stored in the command-address queue to the control logic circuit in response to the second bus being in an idle state, and the control logic circuit is configured to perform an operation corresponding to the second command-address.

11. A method of operating a memory device including a first memory plane and a second memory plane operating independently of each other, the method comprising:

receiving a first command-address instructing an input/output (I/O) operation for the first memory plane through a first bus;

performing an operation corresponding to the first command-address;

receiving a second command-address instructing an I/O operation for a second memory plane through the first bus;

storing the second command-address in a command-address queue based on a state of a second bus; and performing an operation corresponding to the second command-address.

12. The method of claim 11, wherein the storing of the second command-address in the command-address queue comprises:

monitoring a state of the second bus; and storing the second command-address in the command-address queue in response to the second bus being in a busy state.

13. The method of claim 12, wherein the memory device further comprises a third memory plane, wherein the receiving of the second command-address further includes receiving a third command-address instructing an operation related to the third memory plane through the first bus, and the storing of the second command-address in the command-address queue further includes storing the third command-address in the command-address queue in response to the second bus being in the busy state.

14. The method of claim 11, wherein the performing of the operation corresponding to the second command-address comprises:

monitoring a state of the second bus;

providing the second command-address stored in the command-address queue to a control logic circuit in response to the second bus being in an idle state; and performing the operation corresponding to the second command-address.

15. A memory system comprising:

a memory controller configured to generate a first command-address and a second command-address;

a memory device configured to perform an operation in response to the first command-address and the second command-address;

a first bus configured to provide the first command-address and the second command-address to the memory device from the memory controller; and a second bus configured to transfer data between the memory controller and the memory device, wherein the memory device includes, a memory cell array including a first memory plane and a second memory plane;

a control logic circuit connected to the first bus and configured to receive the first command-address and the second command-address;

an input/output (I/O) circuit connected to the second bus and configured to transmit and receive data to and from the memory controller; and a command-address management circuit configured to receive the second command-address through the control logic circuit based on a state of the second bus, wherein the command-address management circuit includes, a command-address queue configured to store the second command-address, and a monitoring circuit configured to monitor the state of the second bus.

16. The memory system of claim 15, wherein the first command-address includes a command configured to instruct an I/O operation for the first memory plane, and the second command-address includes a command configured to instruct an I/O operation for the second memory plane.

17. The memory system of claim 15, wherein the memory device is configured to transmit first data and second data through the I/O circuit, the first data includes a first value stored in the first memory plane, the second data includes a second value stored in the second memory plane, and the second data is transmitted after the transmission of the first data is completed.

18. The memory system of claim 15, wherein the memory device is configured to receive first data and second data through the I/O circuit, the first data is stored in the first memory plane, the second data is stored in the second memory plane, and the second data is received after the reception of the first data is completed.

19. The memory system of claim 15, wherein the command-address management circuit is configured to store the second command-address in the command-address queue in response to the I/O circuit processing first data corresponding to the first command-address.

20. The memory system of claim 15, wherein the command-address management circuit is configured to provide the second command-address stored in the command-address queue to the control logic circuit in response to the second bus being in an idle state, and the control logic circuit is configured to perform an operation corresponding to the second command-address.

* * * * *